(12) United States Patent
Yoshioka

(10) Patent No.: US 7,069,912 B2
(45) Date of Patent: Jul. 4, 2006

(54) FUEL FILTER AND FUEL SUPPLY SYSTEM

(75) Inventor: Hiroshi Yoshioka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 171 days.

(21) Appl. No.: 10/781,838

(22) Filed: Feb. 20, 2004

(65) Prior Publication Data

US 2004/0222142 A1 Nov. 11, 2004

Related U.S. Application Data

(63) Continuation of application No. PCT/JP02/01601, filed on Feb. 8, 2003.

(51) Int. Cl.
*F02M 37/04* (2006.01)

(52) U.S. Cl. .................. 123/509; 123/510; 210/304; 210/309

(58) Field of Classification Search ................ 123/509, 123/510, 514, 447, 456, 198 D; 210/304, 210/309, 299, 306, 321, 76
See application file for complete search history.

(56) References Cited

U.S. PATENT DOCUMENTS

| | | | |
|---|---|---|---|
| 2,708,521 A | | 5/1955 | Saloum |
| 3,078,650 A | | 2/1963 | Anderson et al. |
| 3,272,336 A | | 9/1966 | Humbert, Jr. |
| 3,508,383 A | | 4/1970 | Humbert, Jr. et al. |
| 3,718,258 A | * | 2/1973 | Sharpe .................. 210/98 |
| 4,298,465 A | | 11/1981 | Druffel |
| 4,780,203 A | * | 10/1988 | Barcy .................. 210/304 |
| 4,986,907 A | * | 1/1991 | Montemayor Uzeta ..... 210/179 |
| 5,392,750 A | * | 2/1995 | Laue et al. ................ 123/509 |
| 5,564,396 A | * | 10/1996 | Kleppner et al. .......... 123/509 |
| 5,569,373 A | | 10/1996 | Smith et al. |
| 5,699,773 A | * | 12/1997 | Kleppner et al. .......... 123/510 |
| 5,762,047 A | | 6/1998 | Yoshioka et al. |
| 5,868,932 A | | 2/1999 | Guichaoua et al. |
| 5,960,775 A | * | 10/1999 | Tuckey .................... 123/509 |
| 6,125,826 A | * | 10/2000 | Brocard et al. ............ 123/510 |
| 6,491,028 B1 | * | 12/2002 | Gaston et al. ............. 123/509 |
| 6,520,163 B1 | * | 2/2003 | Yoshioka et al. .......... 123/510 |
| 6,540,926 B1 | * | 4/2003 | Goodrich .................. 210/801 |
| 6,655,364 B1 | * | 12/2003 | Yoshioka .................. 123/509 |
| 6,807,948 B1 | * | 10/2004 | Kanamaru et al. ......... 123/495 |
| 2001/0052490 A1 | | 12/2001 | Wong et al. |

FOREIGN PATENT DOCUMENTS

| | | |
|---|---|---|
| JP | 10-43513 A | 2/1998 |
| JP | 11-294283 A | 10/1999 |
| WO | WO 96/23967 A1 | 8/1996 |

* cited by examiner

*Primary Examiner*—Carl S. Miller
(74) *Attorney, Agent, or Firm*—Sughrue Mion, PLLC

(57) ABSTRACT

A fuel filter includes: a filtration chamber consisting of an inner cylinder and an outer cylinder disposed concentrically with a predetermined space, a bottom part that closes an opening end on one end side of the inner cylinder and the outer cylinder, and a lid part disposed with a fuel suction pipe and a fuel sending pipe, that closes an opening end on the other end side of the inner cylinder and the outer cylinder; and a filtering member that is accommodated in a filtration chamber and filtrates fuel that flows into the filtration chamber. In this filter, a centrifugal force applying member for centrifuging the fuel that flows into is disposed at the end of the filtering member on the lid part side. A groove portion extending along an inner wall face of the outer cylinder is formed on the bottom part.

8 Claims, 12 Drawing Sheets

FUEL FILTER AND FUEL SUPPLY SYSTEM

This application is a continuation of PCT/JP02/01601 filed Feb. 8, 2003.

TECHNICAL FIELD

The present invention relates to a fuel filter used in a fuel supply system installed in, for example, a fuel tank of a vehicle and a fuel supply system using the fuel filter, and more particularly to a structure of a fuel filter for achieving extension of life and miniaturization.

BACKGROUND ART

FIG. 9 is a sectional view showing a construction of a fuel supply system in which a conventional fuel filter is used, which is disclosed in the Japanese Patent Publication (unexamined) No. 1998-43513, for example.

In the drawing, reference numeral 1 is a fuel supply system, and a fuel tank mounting plate 2 is mounted on a fuel tank 3.

A bracket 4 is welded to the fuel tank mounting plate 2, and the bracket 4 holds the vicinity of a cover rubber 7 and a filter in the fuel tank (intank filter) 6 attached to a fuel pump suction port 5 and supports a fuel pump 8.

A fuel filter 9 composed of a filter and a container made of thermoplastic resin, in which the mentioned filter is accommodated, is disposed on an outer circumference of a casing of the fuel pump 8. A discharge port 10 of the fuel pump 8 and a connection port 11 of the fuel filter 9 are fitted and connected.

The fuel pump 8 is composed of a pump (not shown) and a DC motor (not shown) having a copper commutator (not shown) and a carbon brush (not shown). The pump is driven by the DC motor and sucks a fuel in the fuel tank 3 and discharges it out of the fuel tank 3.

In this structure, in order to cool the DC motor of the fuel pump 8, the fuel is caused to pass through inside of the fuel pump 8 and is then discharged.

With suction force of the fuel pump 8, the fuel is sucked through the intank filter 6 from the fuel pump suction port 5, sent into the fuel filter 9 through the discharge port 10 of the fuel pump 8 and the connection port 11 of the fuel filter 9, and filtrated.

Then the filtrated fuel is sent out from a fuel sending pipe 12 of the foregoing fuel filter 9 to a fuel feeding pipe 13, and is supplied to a fuel injector (not shown) of an internal combustion engine such as vehicle engine.

A check valve 14 is disposed between the fuel-sending pipe 12 and the fuel-feeding pipe 13 so that the fuel in the fuel-feeding pipe 13 does not return to the fuel pump 8 when stopping the internal combustion engine.

FIG. 10 is a top view of the fuel filter 9 shown in FIG. 9, and FIG. 11 is a side view of the fuel filter 9.

The external structure of the conventional fuel filter 9 shown in FIG. 9 will be described with reference to FIGS. 10 and 11.

The fuel filter 9 has a semi-cylindrical external structure of which central part is substantially columnar hollow, and the fuel pump 8 is disposed in the substantially columnar hollow portion indicated by S in FIG. 10 or FIG. 11.

Referring to FIGS. 10 and 11, reference numeral 16 is a main container of the fuel filter 9, and numeral 23 is an accessory container serving as a lid part of the main container 16. The main container 16 and the accessory container 23 form a container of the fuel filter 9.

The fuel filter 9 is provided, at the upper part thereof (i.e., accessory container 23), with a fuel suction pipe 15 having the connection port 11 fitted to the discharge port 10 of the fuel pump 8, and the fuel sending pipe 12 for sending the filtered fuel to the fuel feeding pipe 13.

FIG. 12 is a sectional view of the fuel filter 9 taken along the line XII—XII in FIG. 10, FIG. 13 is a sectional view of the fuel filter 9 taken along the line XIII—XIII in FIG. 11 or the line XIII—XIII in FIG. 12, and FIG. 14 is an enlarged perspective view of an essential part of the conventional fuel filter shown in FIG. 9 or FIG. 12.

Next, structure of the conventional fuel filter 9 will be described with reference to FIGS. 12 to 14.

The conventional fuel filter 9 is of a semi-cylindrical configuration with a substantially columnar space at the central portion thereof, and the fuel pump 8 is disposed in the substantially columnar space portion S at the center.

In the construction of the fuel filter 9 having the semi-cylindrical configuration with a substantially columnar hollow part at the central portion thereof, the main container 16 consisting of an inner wall 17, an outer wall 18, a side wall 19 and a bottom wall 20, and an accessory container 23 (i.e., lid part of the main container 16) in which the fuel sending pipe 12 and the fuel suction pipe 15 having the connection port 11 and an suction port 22 are disposed forming a container unit. This container unit forms a semi-cylindrical filtration chamber 21 in the form of a compartment, of substantially U-shape in cross-section in radial direction (i.e., in the direction orthogonal to the central axis of the substantially columnar hollow portion S), and a filter 24 is disposed in this filtration chamber 21.

The filter 24 disposed in the filtration chamber 21 is composed of a substantially cylindrical plate 25 formed along a wall face of the inner wall 17 by pressing a metal sheet (including the case of forming the plate of thermoplastic resin) and a filtering member 26 composed of pleated nonwoven fabric.

In the mentioned plate 25 and the filtering member 26, a lower end plate 29 of a substantially U-shape in section in radial direction is adhered to an end on the bottom wall 20 side of the main container 16 with an adhesive agent. An upper end plate 33 of a substantially U-shape in section, where a filtered fuel sending pipe 32 provided with a filtered fuel inlet 30 and a filtered fuel outlet 31 is disposed, is adhered to an end on the accessory container 23 side with an adhesive agent.

In other words, the plate 25 and the filtering member 26 in the filtration chamber 21 are fixed, by the lower end plate 29 having a substantially U-shape in section and serving as a fixing member, at their ends on the bottom wall 20 side of the main container 16 and also fixed, by the upper end plate 33 having a substantially U-shape in section and serving as a fixing member, at their ends on the accessory container 23.

The plate 25 is provided with at least one groove 34 in the circumferential direction, whose total area is larger than the area of the filtered fuel inlet 30 or the opening of the fuel sending pipe 12, so that filtered fuel may accurately flows up to a V-shaped peak, in which the fuel sending pipe 32 is inserted, even if the V-shaped peak of the pleated filtering member 26 is tightly in contact with the plate 25.

In the construction described above, the fuel discharged from the discharge port 10 at the top of the fuel pump 8 runs from the suction port 22 through the fuel suction pipe 15 of the accessory container 23 and flows into the filtration chamber 21.

Since the upper end plate 33 is substantially simple U-shaped in section in radial direction and the upper end plate 33 is flat in circumferential face, as indicated with arrows A in FIG. 14, the fuel that has flown into the filtration chamber 21 is not swirled by the upper end plate 33 but flows straight in axial direction of the filtration chamber 21 (i.e., in the direction parallel with the central axis of the substantially columnar hollow portion S of the fuel filter 9 formed by the main container 16) due to gravity and flows directly into the filtering member 26 composing the filter 24.

Subsequently, the filtering member 26 filters the fuel, which flows from the filtered-fuel-sending pipe 32 to the fuel-sending pipe 12.

In the conventional fuel filter constructed as described above, the upper end plate 33 for fixing the plate 25 and the filtering member 26 are substantially simple U-shaped in section in radial direction and the upper end plate 33 is flat in circumferential face on the accessory container 23 side. Therefore, the fuel that has flown into the filtration chamber 21 is not swirled by the upper end plate 33 but flows straight in axial direction of the filtration chamber 21 (i.e., in the direction parallel with the central axis of the substantially columnar hollow portion S of the fuel filter 9 formed by the main container 16) due to gravity and flows directly into the filtering member 26.

However, the fuel discharged from the fuel pump 8 (i.e., the fuel flowing into the filtration chamber 21) is mixed with metal abrasion powder (foreign matter) produced at the time when the commutator and the brush forming the dc motor touch to each other. This metal abrasion powder (foreign matter) also flows along the flow of the fuel in the filtration chamber 21 and is caught by the filtering member 26.

Particle (grain) size of this metal abrasion powder (foreign matter) is larger than mesh size of the intank filter 6 fitted to the fuel pump suction port 5 of the fuel pump 8. As a result, a problem exists in that the metal abrasion powder occupies a large percentage of contamination that clogs the filtering member 26 and shortens the life of the fuel filter 9.

In order to extend the life of the fuel filter 9, it is necessary to enlarge the filtration area of the filtering member 26, and the fuel filter 9 becomes large in size. As a result, another problem exists in that capacity of storing (keeping) fuel in the fuel tank becomes small.

The present invention has been made to solve the foregoing problems, and has an object of providing a fuel filter capable of assuring long-life and miniaturized. The invention also has an object of providing a fuel supply system of which life is extended and capacity of fuel kept in the fuel tank can be increased by using the above mentioned fuel filter.

DISCLOSURE OF INVENTION

A fuel filter according to the present invention includes: a filtration chamber comprised of an inner cylinder and an outer cylinder disposed concentrically with a predetermined space, a bottom part that closes an opening end on one end side of the mentioned inner cylinder and the outer cylinder, and a lid part, in which a fuel suction pipe and a fuel sending pipe are disposed, that closes an opening end on the other end side of the mentioned inner cylinder and the outer cylinder; a filtering member that is accommodated in the mentioned filtration chamber and filtrates fuel that flows from the fuel suction pipe into the mentioned filtration chamber; a centrifugal force applying member, which is disposed at an end of the mentioned filtration chamber on the mentioned lid part, for centrifuging the fuel that flows into the mentioned filtration chamber; and a groove portion extending along an inner wall face of the mentioned outer cylinder and formed on the mentioned bottom part.

In this fuel filter, a centrifugal force applying member for centrifuging the fuel that flows into the filtration chamber is disposed at the end of the filtering member on the lid part side, and a groove portion extending along an inner wall face of the outer cylinder is formed on the bottom part.

In the fuel filter of above construction, fuel that has flown into the filtration chamber is swirled and centrifuged by the centrifugal force applying member, and abrasion powder of a large particle size in the fuel is separated due to difference in specific gravity and collected on the inner wall face of the outer cylinder forming the filtration chamber, flows down along the inner wall face of the outer cylinder by gravitation, and is stored in the groove portion formed on the bottom part. As a result, abrasion powder of large particle size is hardly caught by the filtering member, and it is possible to greatly reduce clogging of the filtering member and prevent the fuel filter from shortening of life.

Further, due to extension of life of the fuel filter, it is not necessary to enlarge the filtering member, and it is therefore possible to miniaturize the fuel filter and increase storage capacity of fuel stored in the fuel tank.

The filtering member of the fuel filter according to the invention has preferably pleats-like folds formed substantially in the same direction as the flowing direction of the fuel centrifuged by the centrifugal force applying member.

In the fuel filter of the mentioned construction, the fuel that flows into the filtration chamber and is swirled by the centrifugal force applying member flows in the filtration chamber while swirling kept by the pleats-like folds formed on the filtering member.

As a result, the metal abrasion powder of large particle size produced due to sliding contact between the commutator and the brush and included in the fuel is more easily separated from the fuel, and consequently, it is possible to further reduce clogging of the filtering member and further extend life of the fuel filter.

The fuel filter according to the present invention has a spiral guide projection formed on the inner wall face of the outer cylinder substantially in the same direction as the flowing direction of the fuel centrifuged by the centrifugal force applying member.

In the fuel filter of above construction, the fuel having flown into the filtration chamber is centrifuged and swirled by the centrifugal force applying member, and the swirling fuel flows obliquely while swirling kept in the same direction by the spiral guide projection formed on the inner wall face of the outer cylinder.

As a result, the metal abrasion powder of large particle size produced due to slding contact between the commutator and the brush and included in the fuel is more easily separated from the fuel, and consequently, it is possible to further reduce clogging of the filtering member and further extend life of the fuel filter.

The filtering member of the fuel filter according to the invention has preferably pleats-like folds formed substantially in the same direction as the flowing direction of the fuel centrifuged by the centrifugal force applying member and has a spiral guide projection formed on the inner wall face of the outer cylinder substantially in the same direction as the flowing direction of the fuel centrifuged by the centrifugal force applying member.

In the fuel filter of above construction, the fuel having flown into the filtration chamber is centrifuged and swirled by the centrifugal force applying member, and the swirling fuel flows obliquely while swirling kept in the same direction by both of the pleats-like folds formed on the filtering member and the spiral guide projection formed on the inner wall face of the outer cylinder.

As a result, the metal abrasion powder produced due to sliding contact between the commutator and the brush and included in the fuel is more easily separated from the fuel and, consequently, it is possible to further reduce clogging of the filtering member and further extend life of the fuel filter.

A fuel supply system according to the invention includes: a fuel tank in which unfiltered fuel is stored; the fuel filter as defined in any of claims 1 to 4; and a fuel pump that is disposed in a space portion formed by the inner cylinder of the fuel filter, sends the fuel in the fuel tank into the fuel filter, and sends out the fuel filtrated by the fuel filter toward the internal combustion engine.

In the fuel supply system of above construction, it is possible to prevent shortening of life of the fuel filter used in the system and miniaturize the fuel filter and, consequently, it is possible to realize a fuel supply system in which life is extended and storage capacity of fuel stored in the fuel tank is enlarged.

BEST MODE FOR CARRYING OUT THE INVENTION

Best modes for carrying out this invention are hereinafter described with reference to the accompanying drawings for detailed explanation of the invention.

Embodiment 1.

Figure 1:
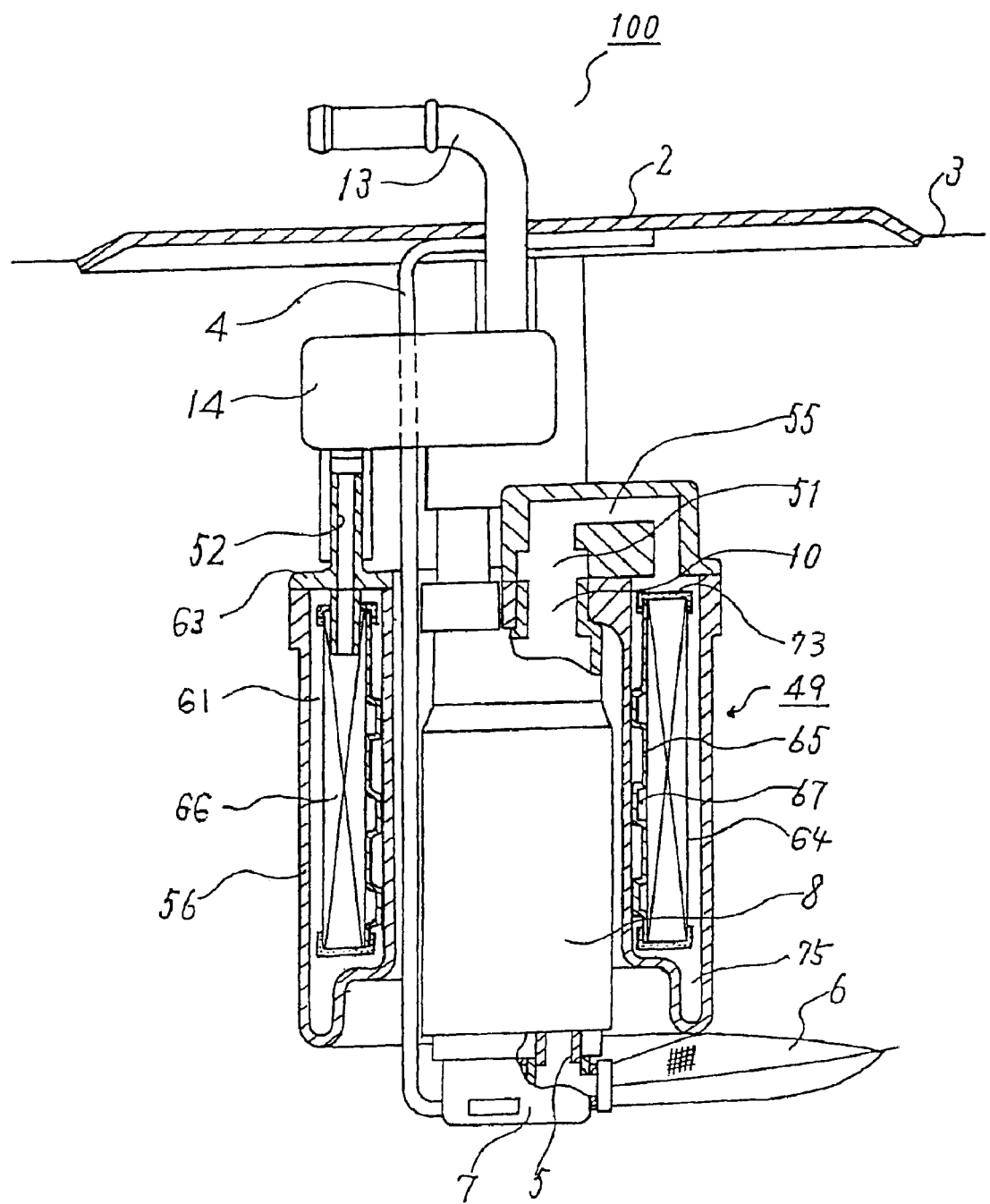
FIG. 1 is a sectional view showing a construction of a fuel supply system in which a fuel filter according to an Embodiment 1 is used.

FIG. 1 is a sectional view showing a construction of a fuel supply system in which a fuel filter according to an Embodiment 1 of the present invention is used.

Figure 2:
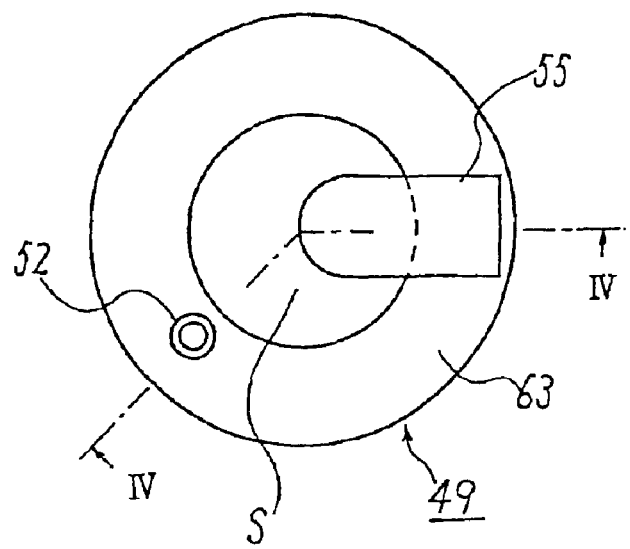
FIG. 2 is a top view of the fuel filter according to the Embodiment 1 shown in FIG. 1.
Figure 3:
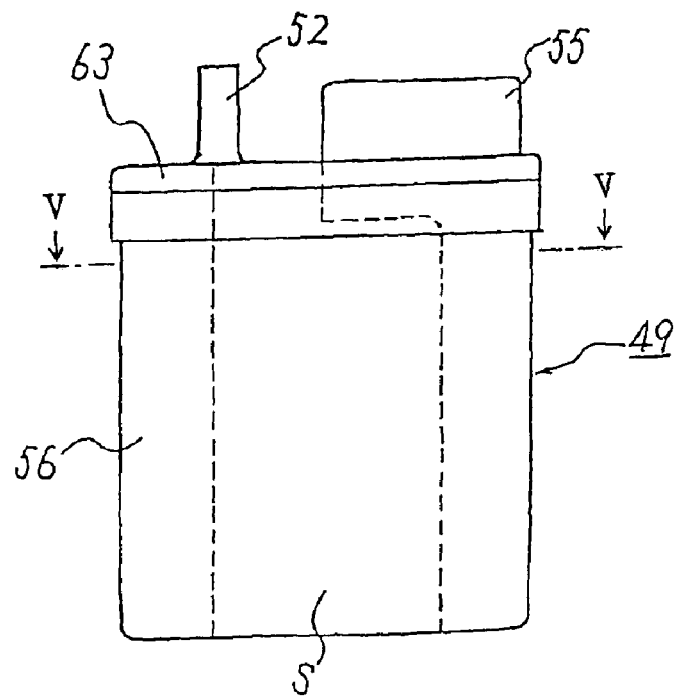
FIG. 3 is a side view of the fuel filter according to the Embodiment 1 shown in FIG. 1.

FIG. 2 is a top view of the fuel filter according to the Embodiment 1 shown in FIG. 1, and FIG. 3 is a side view of the fuel filter according to the Embodiment 1 shown in FIG. 1.

Figure 4:
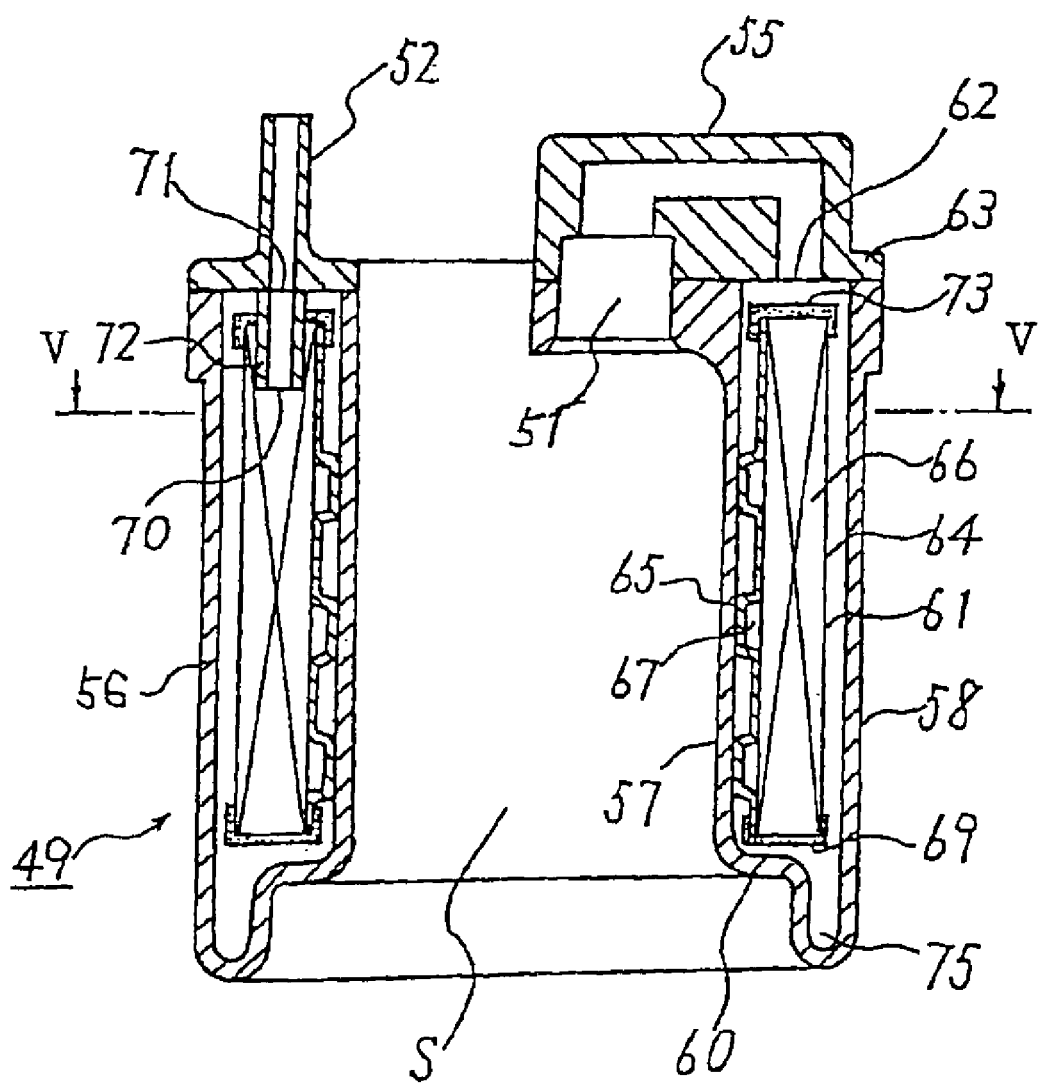
FIG. 4 is a sectional view take along the line IV—IV in FIG. 2.
Figure 5:
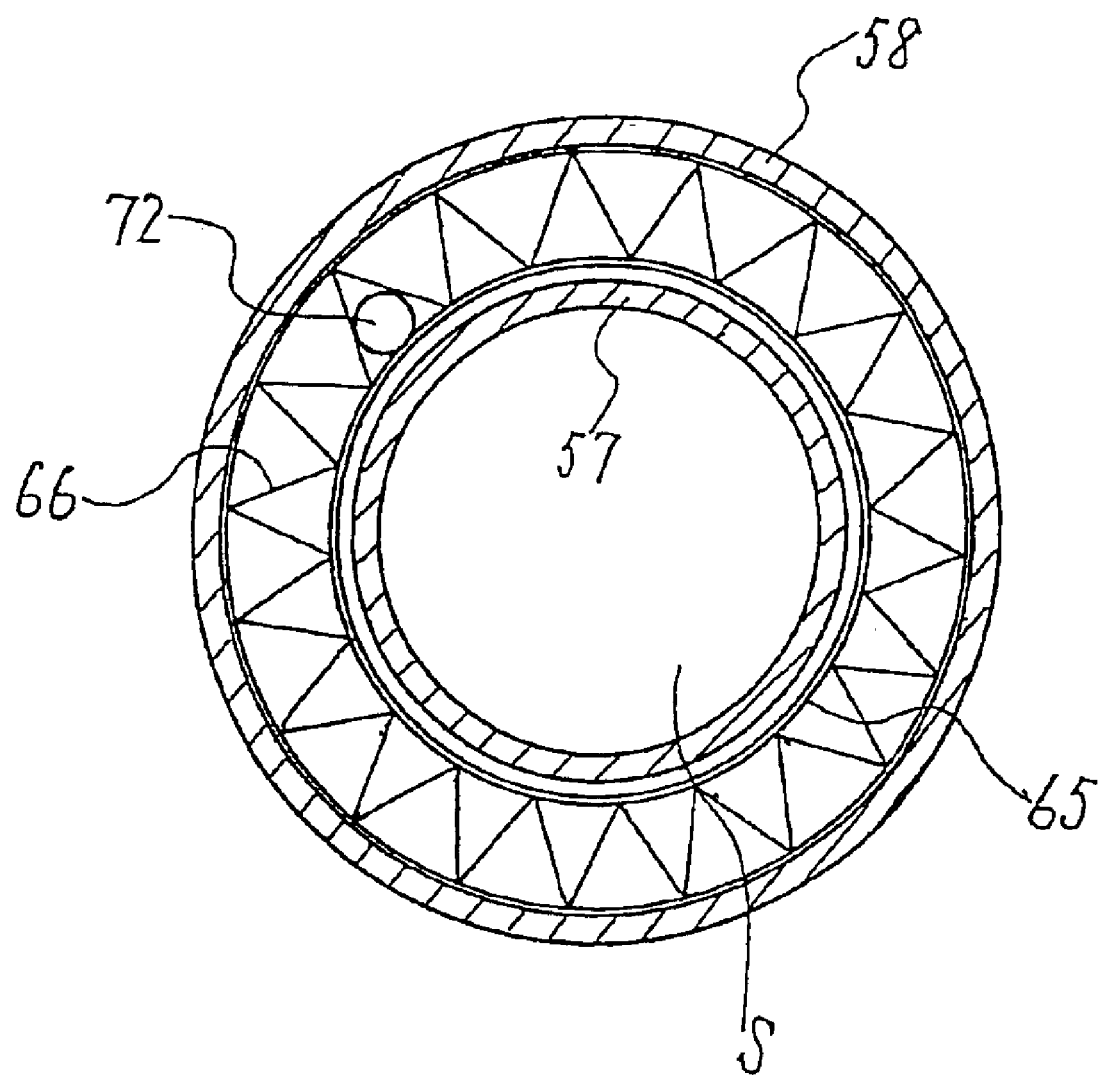
FIG. 5 is a sectional view take along the line V—V in FIG. 3 or the line V—V in FIG. 4.
Figure 6:
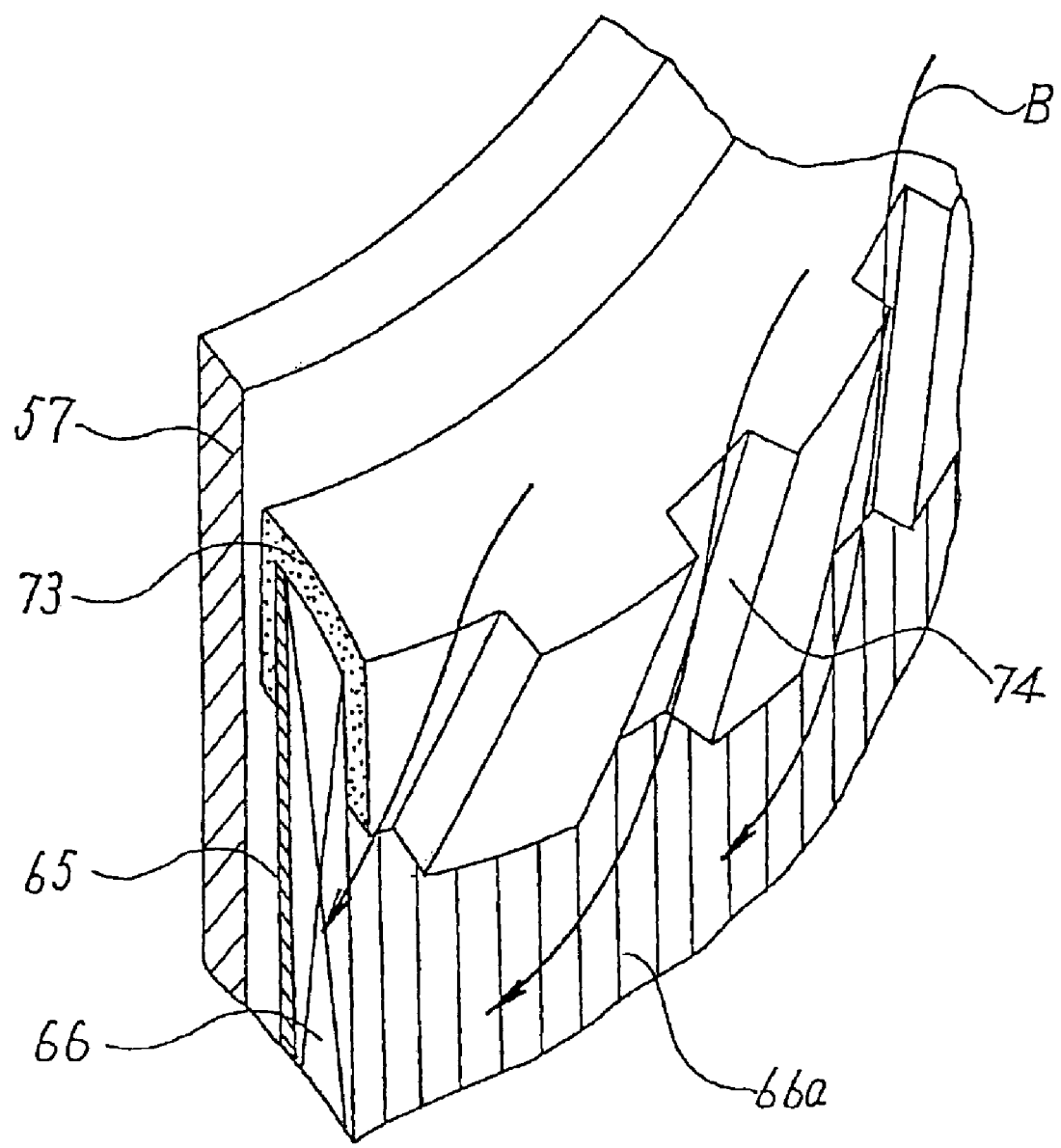
FIG. 6 is an enlarged perspective view of an essential part of the fuel filter according to the Embodiment 1 shown in FIG. 1 or FIG. 4.

FIG. 4 is a sectional view take along the line IV—IV in FIG. 2, FIG. 5 is a sectional view take along the line V—V in FIG. 3 or the line V—V in FIG. 4, and FIG. 6 is an enlarged perspective view of an essential part of the fuel filter according to this embodiment shown in FIG. 1 or FIG. 4.

Referring to FIGS. 1 to 4, reference numeral 100 is a fuel supply system, numeral 2 is a fuel tank mounting plate, numeral 3 is a fuel tank, 4 is a bracket, 5 is a fuel pump suction port, 6 is a filter in the fuel tank (intank filter), 7 is a cover rubber, 8 is a fuel pump, 10 is a discharge port, 13 is a fuel feeding pipe, 14 is a check valve, 49 is a fuel filter, 51 is a connection port, 52 is a fuel sending pipe, 55 is a fuel suction pipe, 56 is a main container, 57 is an inner wall (inner cylinder), 58 is an outer wall (outer cylinder), 60 is a bottom part, 61 is a filtration chamber, 62 is a suction port, 63 is an accessory container (lid part), 64 is a filter, 65 is a plate, 66 is a filtering member, 66a is one of pleats, 67 is a groove formed on the plate 65, 69 is a lower end plate, 70 is a filtered fuel inlet, 71 is a filtered fuel outlet, 72 is a filtered fuel sending pipe, 73 is an upper end plate, 74 is an oblique passage, and 75 is a groove portion (foreign matter storing portion) formed on the bottom part 60.

Referring to FIG. 1, reference numeral 100 is a fuel supply system in which the fuel filter according to this embodiment is used, and the fuel tank mounting plate 2 is mounted on the fuel tank 3.

The bracket 4 is welded to the fuel tank mounting plate 2, and the bracket 4 holds the vicinity of the cover rubber 7 and the intank filter 6 attached to the fuel pump suction port 5 and supports the fuel pump 8.

The fuel filter 49 composed of a filter 64 and a container made of thermoplastic resin, in which the filter 64 is accommodated, is disposed on an outer circumference of a casing of the fuel pump 8. The discharge port 10 of the fuel pump 8 and a connection port 51 of the fuel filter 49 are fitted and connected.

The fuel pump 8 is composed of a pump (not shown) and a DC motor (not shown in the drawing) having a copper commutator (not shown) and a carbon brush (not shown).

The pump is driven by a DC motor and sucks a fuel in the fuel tank 3 and discharges it.

In this structure, in order to cool the DC motor of the fuel pump 8, the fuel is caused to pass through inside of the fuel pump 8 and is then discharged to the fuel filter 49.

Due to suction force of the fuel pump 8, the fuel is sucked from the fuel pump suction port 5 through the intank filter 6, and is sent from the discharge port 10 of the fuel pump 8 into the fuel filter 49 through the connection port 51 of the fuel filter 49.

The fuel filtrated by the filtering member 66 of the filter 64 flows from the fuel sending pipe 52 of the fuel filter 49 to the fuel feeding pipe 13, and is supplied to a fuel injector (not shown) of a vehicle engine or the like.

The check valve 14 is disposed between the fuel-sending pipe 52 and the fuel-feeding pipe 13 so that the fuel in the fuel-feeding pipe 13 does not return to the fuel pump 8 when stopping the internal combustion engine.

As shown in FIG. 2 and FIG. 3, the fuel filter 49 has a substantially cylindrical external structure of which central part is substantially columnar hollow, and the fuel pump 8 is disposed in the substantially columnar hollow portion indicated by S.

Reference numeral 56 is a main container of the fuel filter 49, 63 is an accessory container serving as the lid part of the main container 56, and the main container 56 and the accessory container (hereinafter referred to as lid part) 63 serving as a lid part of the main container 56 form a container of the fuel filter 49.

The fuel filter 49 is provided, at the accessory container 63, with a fuel suction pipe 55 having the connection port 51 fitted to the discharge port 10 of the fuel pump 8, and the fuel sending pipe 52 for sending the filtered fuel to the fuel feeding pipe 13.

The concrete construction of the fuel filter 49 according to this embodiment is hereinafter described with reference to FIGS. 1 to 4.

In the construction of the fuel filter 49 of a substantially cylindrical configuration with a substantially columnar hollow part at the central portion thereof, the main container 56 includes the inner wall (i.e., the inner cylinder.) 57, the outer wall (i.e., the outer cylinder) 58 and a bottom wall 60, and the accessory container (i.e., lid part) 63 includes the fuel suction pipe 55 having the connection port 51 and the suction port 62 and a fuel sending pipe 52. The main container 56 and the accessory container 63 form a filtration chamber 61, which has O-shape (ring-shape) cross section in radial direction.

In other words, the filtration chamber 61 is composed of the inner wall (hereinafter referred to as inner cylinder) 57 and the outer wall (hereinafter referred to as outer cylinder) 58 disposed concentrically with a predetermined space, a bottom part 60 that closes an opening end on one end side of the inner cylinder 57 and the outer cylinder 58, and the lid part 63, in which a fuel suction pipe 55 and the fuel sending pipe 52 are disposed, that closes an opening end on the other end side of the inner cylinder 57 and the outer cylinder 58.

In this structure, the filter 64 is disposed (accommodated) in the filtration chamber 61.

The plate 65 is formed into a cylindrical configuration along the outside wall face of the inner cylinder 57 by pressing a metal sheet (it is also preferable that the plate is formed of thermoplastic resin or the like).

The filtering member 66 is composed of, for example, nonwoven fabric with a large number of pleats-like folds, and is formed into a ring-shaped (cylindrical) configuration along the plate 65.

As shown in FIG. 5 or FIG. 6, the pleats-like folds 66*a* of the filtering member 66 are formed substantially in parallel to each other in the axial direction of the filtration chamber 61 (i.e., in a direction parallel to the central axes of the inner cylinder 57 and the outer cylinder 58 forming the filtration chamber 61).

In the plate 65 and the filtering member 66 forming the filter 64, a lower end plate 69 of substantially U-shape in section is adhered to an end on the bottom part 60 side forming the filtration chamber 61 with an adhesive agent. An upper end plate 73, on which the filtered fuel sending pipe 72 having the filtered fuel inlet 70 and the filtered fuel outlet 71 is disposed, is adhered to an end on the lid part 63 side with an adhesive agent.

In other words, both ends of the plate 65 and the filtering member 66 are fixed by the lower end plate 69 and the upper end plate 73 serving as fixing members.

The plate 65 is provided with at least one groove 67 in the circumferential direction, whose total area is larger than the area of the filtered fuel inlet 70 or the opening of the fuel sending pipe 52, so that filtered fuel may accurately flows up to a V-shaped peak, in which the fuel sending pipe 72 is inserted, even if the V-shaped peak of the pleated filtering member 66 is tightly in contact with the plate 65.

FIG. 6 is an enlarged perspective view of the essential part of the fuel filter according to the Embodiment 1 of the present invention.

The fuel filter according to this embodiment is characterized in that an oblique passage 74 for centrifuging the fuel sent into the filtration chamber 61 is formed on an outer circumferential face of the upper end plate 73 serving as a fixing member on the lid part 63 side (i.e., on the side where the fuel suction pipe 55 is disposed), as shown in FIG. 6. Further, a ring-shaped groove portion (i.e., foreign matter storing portion) 75 extending along an inner wall face of the outer cylinder 58 and having a predetermined depth in a direction parallel to the axial direction (i.e., in the central axis direction of the inner cylinder 57 and the outer cylinder 58 forming the filtration chamber 61) is formed on the bottom part 60 forming the filtration chamber 61, as shown FIG. 4.

In addition, the oblique passage 74 can be provided by, for example, forming plural groove portions or cutout portions inclined at a predetermined angle to the folds 66*a* of the filtering member 66 on the outer circumferential face of the upper end plate 73 of substantially U-shape in section serving as a fixing member.

The upper end plate 73 provided with the oblique passage 74 for application of centrifugal force to the fuel sent into the filtration chamber 61 on its outer circumferential face is hereinafter referred to as centrifugal force applying member.

The ring-shaped groove portion (i.e., the foreign matter storing portion) 75 extending along the inner wall face of the outer cylinder 58 is formed into a configuration with its depth sufficiently larger than its opening width in order to prevent the caught abrasion powder from returning to the filtration chamber 61.

The fuel discharged from the discharge port 10 located at the top of the fuel pump 8 passes through the fuel suction pipe 55 disposed in the lid part 63 and is sent from the suction port 62 into the filtration chamber 61.

The arrows indicated by B in FIG. 6 show the flow of fuel going into the filtration chamber 61.

The fuel having flown into the filtration chamber 61 begins to swirl by passing through the oblique passage 74 of the upper end plate 73 (i.e., due to the centrifugal force applying member), and as indicated by the arrows B in FIG. 6, the fuel flows into the filtering member 66 composing the filter 64 while circulating in the circumferential direction in the filtration chamber 61.

Figure 13:
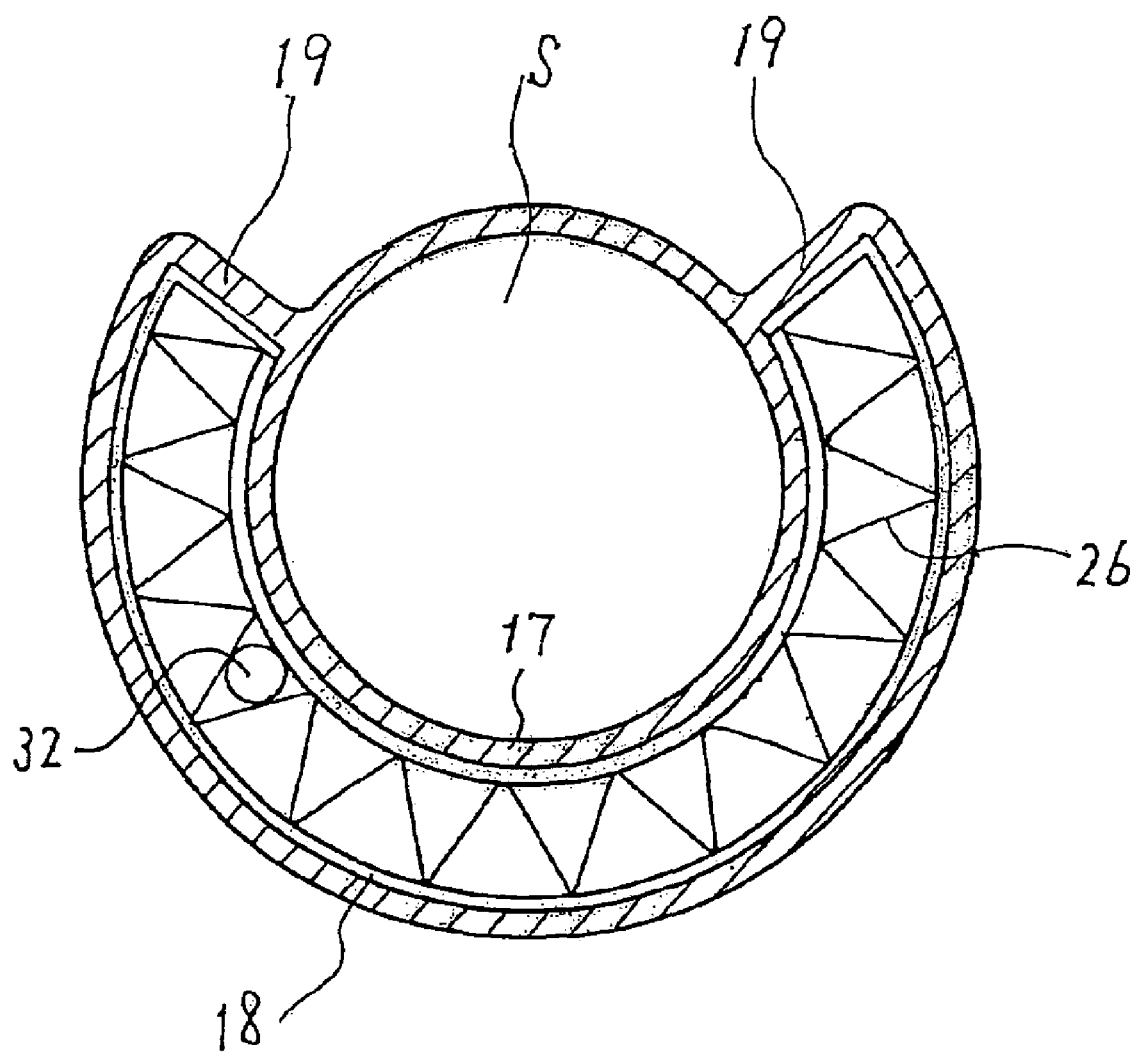
FIG. 13 is a sectional view take along the line XIII—XIII in FIG. 11 or the line XIII—XIII in FIG. 12.
Figure 14:
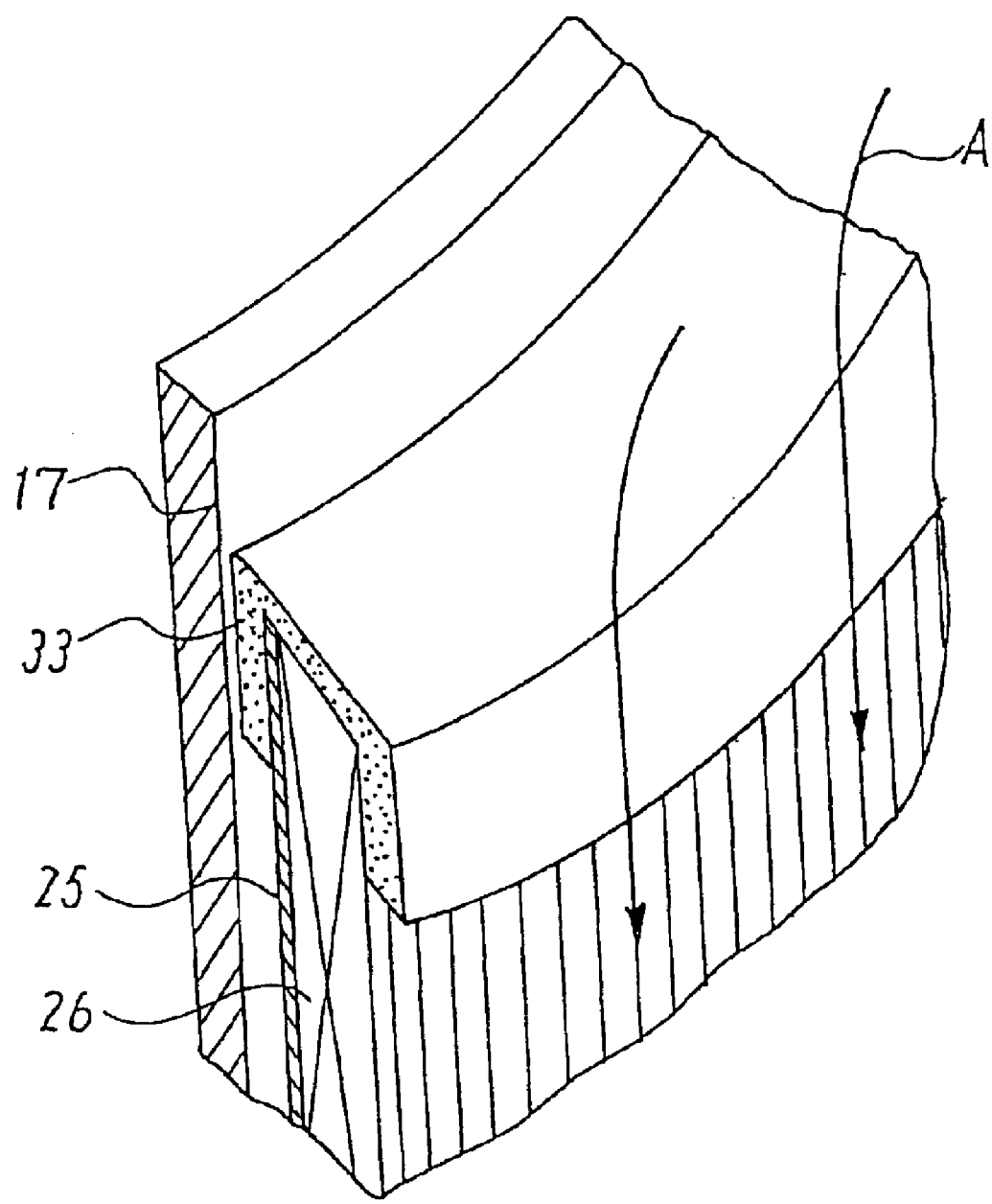
FIG. 14 is an enlarged perspective view of an essential part of the conventional fuel filter shown in FIG. 12.

In addition, since the filtration chamber 61 is O-shaped (ring-shaped) in section in radial direction and has no side wall 19 unlike the conventional filter (see FIG. 13 ), the fuel applied with a centrifugal force by passing through the oblique passage 74 is free from interruption in circulating in the circumferential direction.

As a result, the metal abrasion powder (foreign matter) that has been produced due to sliding contact between the brush and the commutator, included in the fuel and discharged from the fuel pump 8 is also subject to centrifugal force by the swirling flow of the fuel in the filtration chamber 61. Thus, the metal abrasion powder is separated from the fuel due to difference in specific gravity, and comes together on the inner wall face of the outer cylinder 58 forming the filtration chamber 61. Then, the metal abrasion powder falls down along the inner wall face of the outer cylinder 58 due to its own weight and is caught by the ring-shaped groove portion 75 serving as a foreign matter storing portion formed on the bottom part 60 along the inner wall face of the outer cylinder 58.

Accordingly, the abrasion powder produced due to sliding contact between the commutator and the brush, thereby causing life of the fuel filter 49 to be shortened, is selectively caught by the ring-shaped groove portion (foreign matter storing portion) 75, and therefore it is possible to greatly reduce the abrasion powder flowing into filtering member 66.

As described above, in the fuel filter 49 according to the Embodiment 1, the metal abrasion powder of a large particle size produced in the fuel pump 8 is hardly caught by the filtering member 66, and the abrasion powder of large particle size is stored in the ring-shaped groove portion (the foreign matter storing portion) 75. Consequently, frequency in clogging of the filtering member 66 is greatly lowered, and it is eventually possible to prevent life of the fuel filter 49 from being shortened.

Furthermore, owing to extension of life of the fuel filter 49, it is not necessary to enlarge size of the filtering member 66, and it is therefore possible to miniaturize the fuel filter 49 and increase capacity of fuel stored in the fuel tank 3.

As a result of achieving extension of life as well as miniaturization of the fuel filter, it is also possible to achieve extension of life and miniaturization of the fuel supply system itself in which this fuel filter 49 is used.

Embodiment 2.

Figure 7:
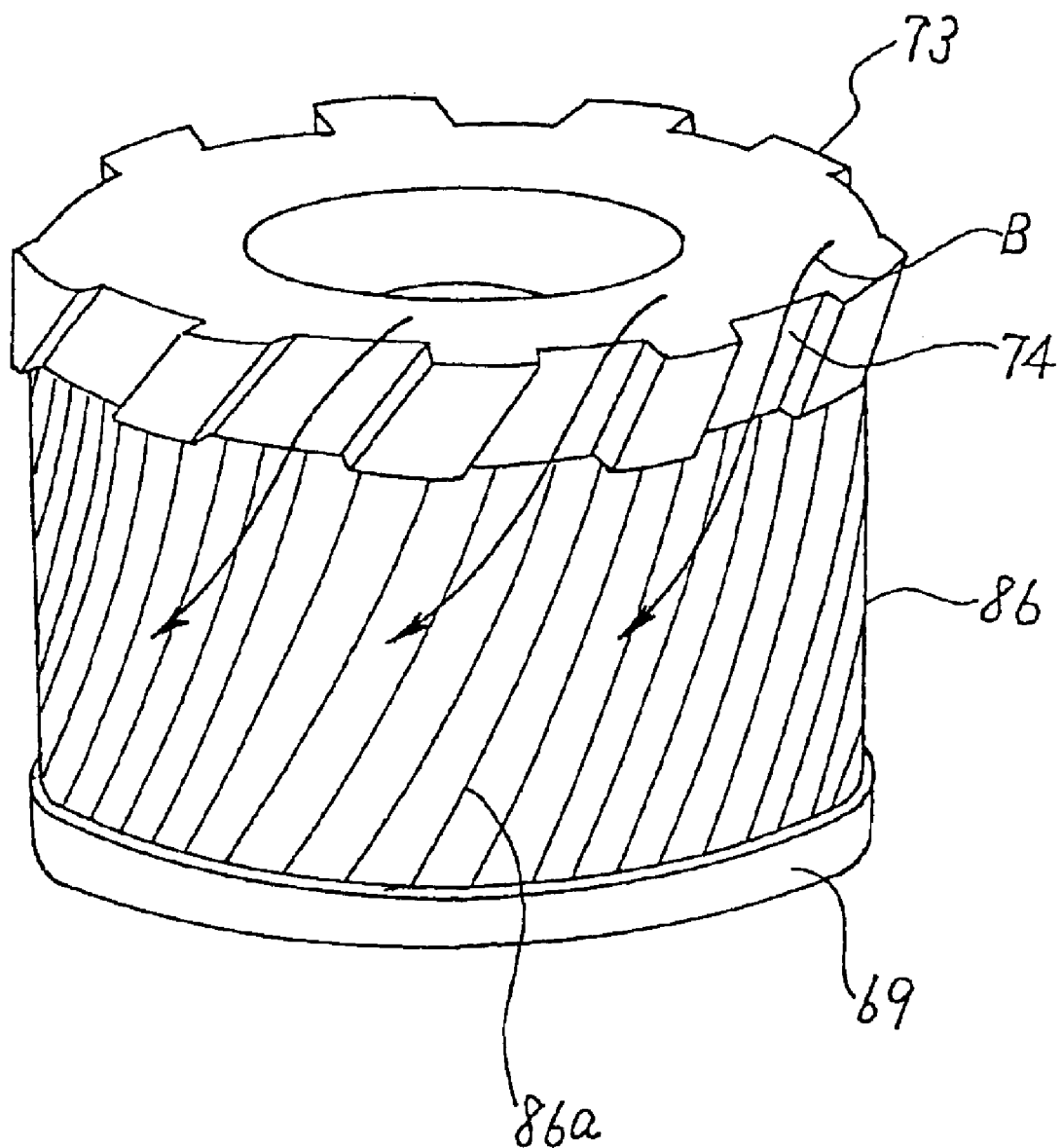
FIG. 7 is an enlarged perspective view of an essential part of a fuel filter according to an Embodiment 2.

FIG. 7 is an enlarged perspective view of an essential part of a fuel filter according to an Embodiment 2 of the present invention.

In the drawing, reference numeral 69 is a lower end plate serving as a fixing member on the bottom part 60 side forming the filtration chamber 61, 73 is an upper end plate serving as a fixing member on the lid part 63 side (i.e., on the side where the fuel suction pipe 55 is disposed), 74 is an oblique passage formed on the outer circumferential face of the upper end plate 73, 86 is a filtering member made of nonwoven fabric with pleats-like folds, and numeral 86a is one of folds of the filtering member 86.

The arrows indicated by B show the flowing direction of fuel.

Likewise in the foregoing Embodiment 1, the upper end plate 73 provided with the oblique passage 74 for application of centrifugal force to the fuel sent into the filtration chamber 61 on its outer circumferential face is hereinafter referred to as centrifugal force applying member.

In the fuel filter according to the foregoing Embodiment 1, the folds 66a of the filtering member 66 made of pleated nonwoven fabric are formed in parallel to each other in the axial direction (i.e., in the direction parallel to the central axes of the inner cylinder 57 and the outer cylinder 58 forming the filtration chamber 61). On the other hand, in the fuel filter according to this Embodiment 2, the pleats-like folds 86a of the filtering member 86 is inclined substantially in the same direction as the direction of inclination of the oblique passage 74 formed on the upper end plate 73 serving as a fixing member.

In other words, the filtering member of the fuel filter according to this embodiment is characterized in that its pleats-like folds formed substantially in the same direction as the flowing direction of the fuel centrifuged by the centrifugal force applying member.

The rest of the construction is the same as that of the fuel filter according to the foregoing Embodiment 1, and further explanation thereof is omitted herein.

As described above, in the fuel filter according to this embodiment, the pleats-like folds 86a are inclined in the same direction as the oblique passage 74, thus the fuel swirled by the oblique passage 74 flows in the filtration chamber 61 with its swirling kept by the folds 86a.

As a result, the metal abrasion powder produced due to sliding contact between the commutator and the brush and included in the fuel is more easily separated from the fuel.

Embodiment 3.

Figure 8:
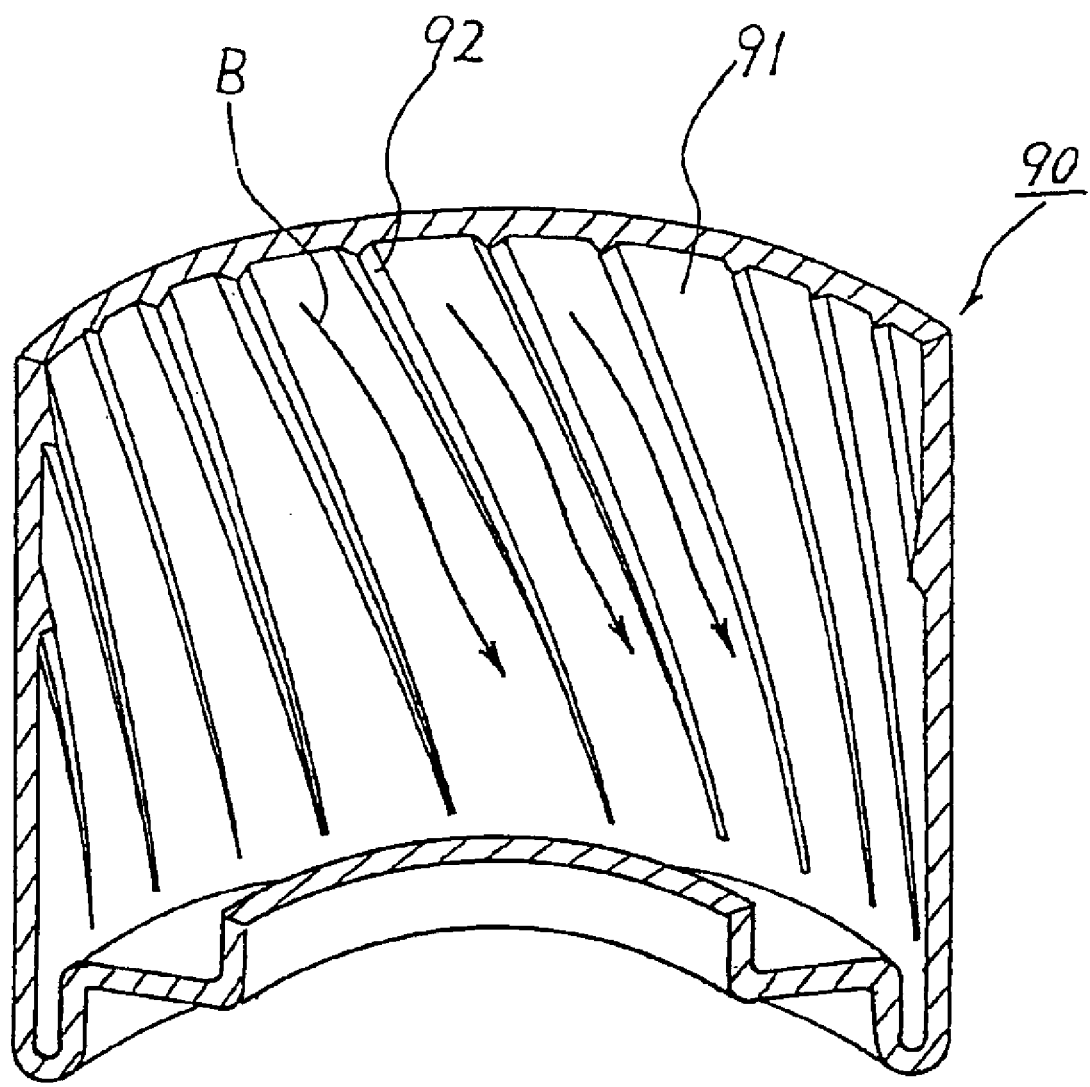
FIG. 8 is an enlarged perspective view of an essential part of a fuel filter according to an Embodiment 3.
Figure 9:
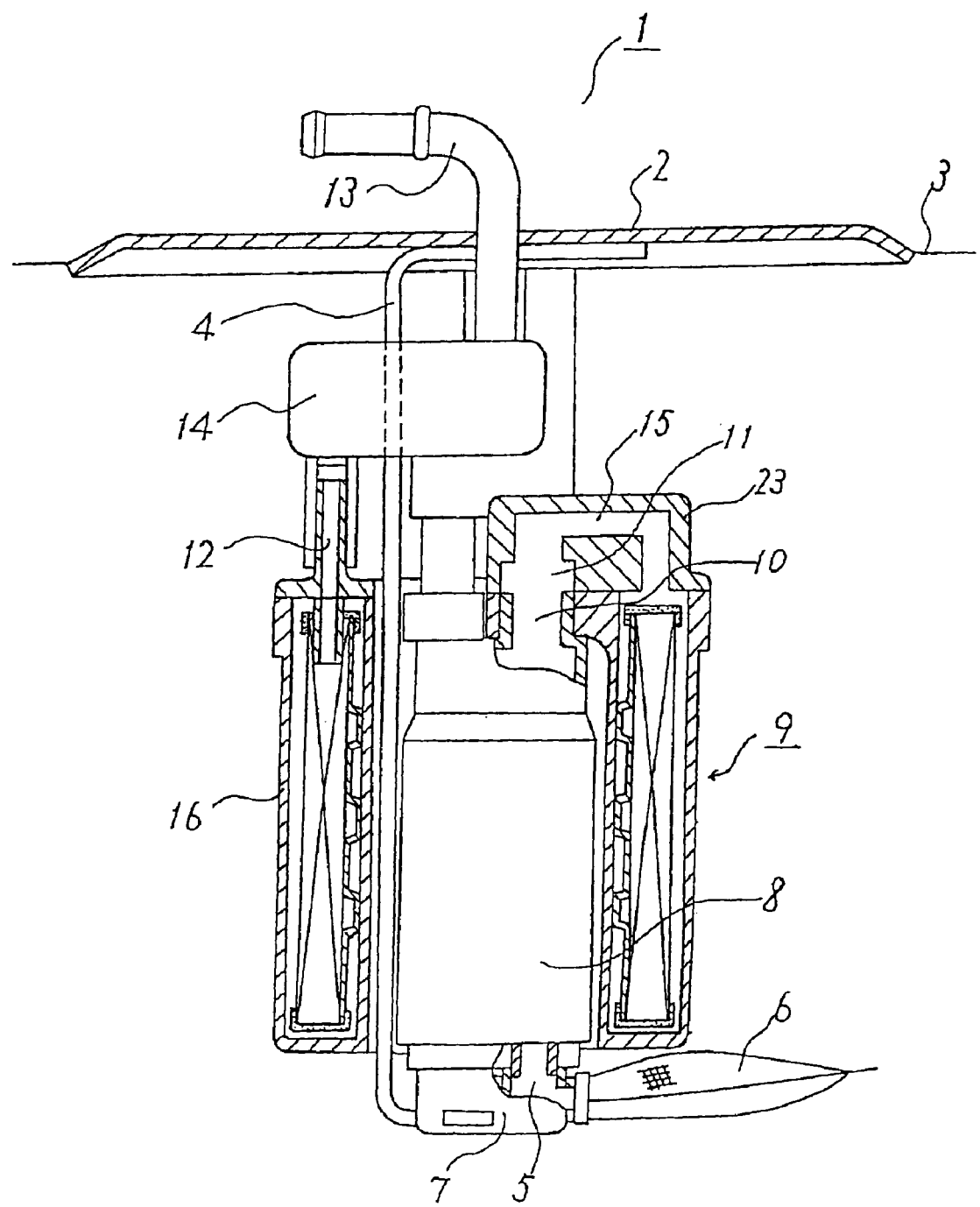
FIG. 9 is a sectional view showing a construction of a fuel supply system in which a conventional fuel filter is used.
Figure 10:
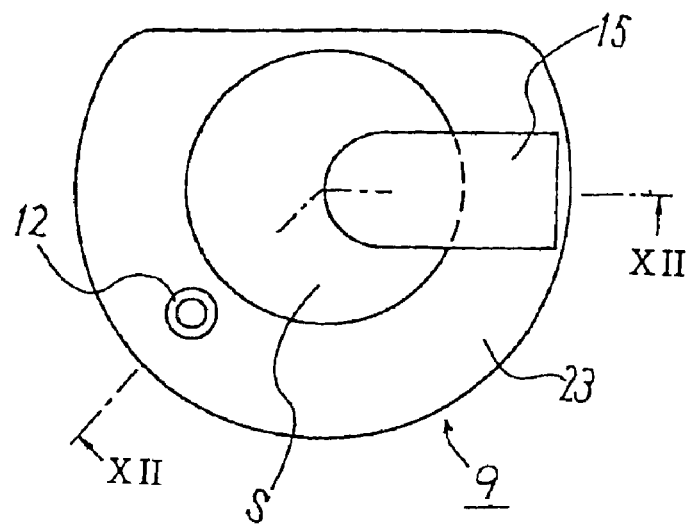
FIG. 10 is a top view of the conventional fuel filter shown in FIG. 9.
Figure 11:
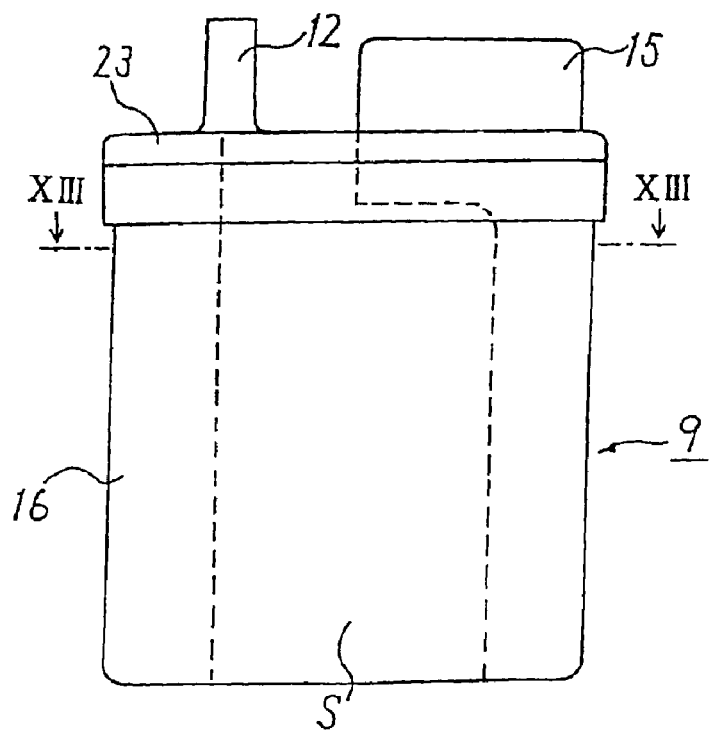
FIG. 11 is a side view of the conventional fuel filter shown in FIG. 9.
Figure 12:
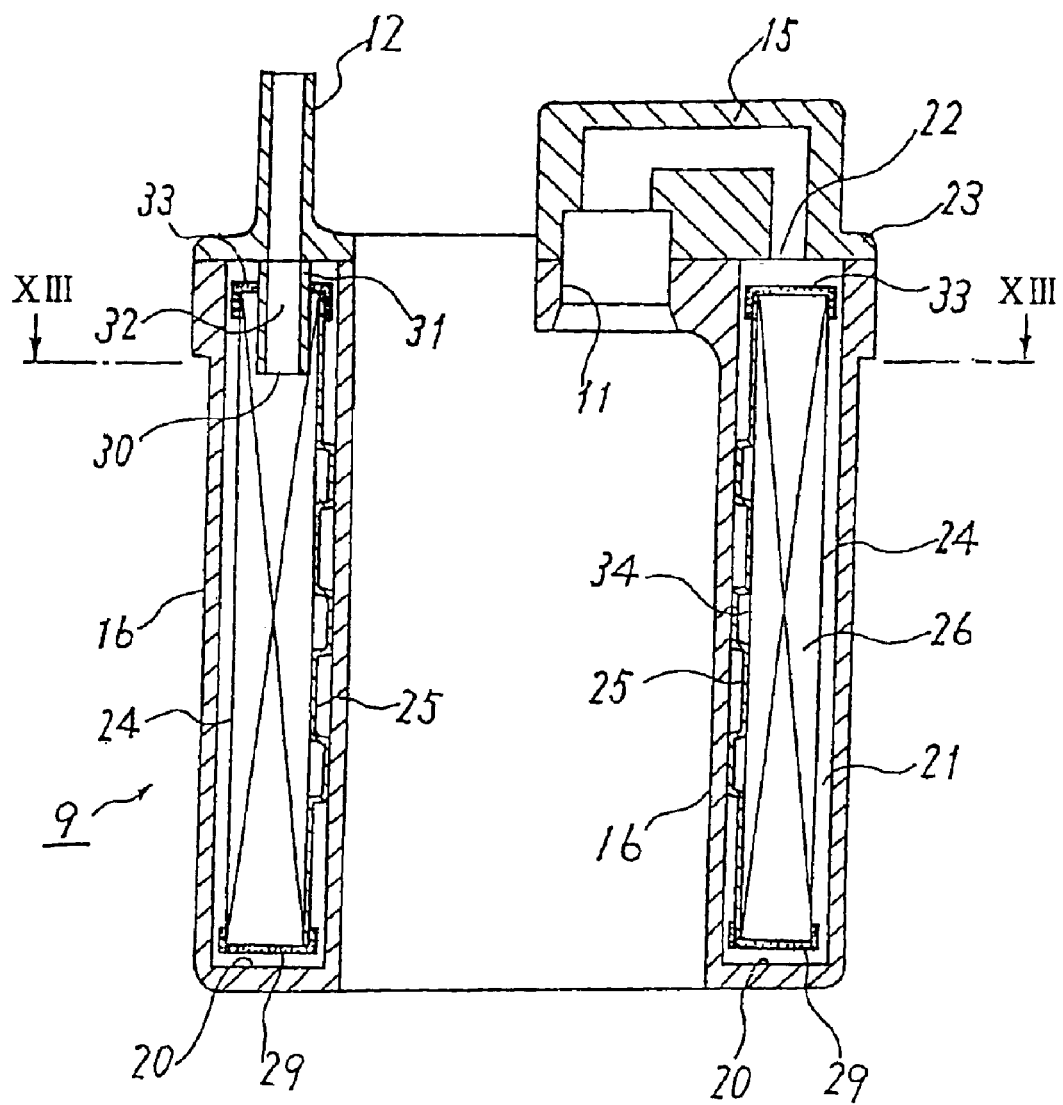
FIG. 12 is a sectional view take along the line XII—XII in FIG. 10.

FIG. 8 is an enlarged perspective view of an essential part of a fuel filter according to Embodiment 3.

In the drawing, reference numeral 90 is a main container corresponding to the main container 56 of the fuel filter according to the foregoing Embodiment 1 or Embodiment 2, 91 is an outer cylinder serving as an outer wall of the main container 90 and forming the filtration chamber 61 not shown, and 92 is a spiral guide projection formed on the inner wall face of the outer cylinder 91.

Although the inner wall face of the outer cylinder 58 forming the filtration chamber 61 of the fuel filter is a substantially smooth face in the foregoing Embodiment 1 and Embodiment 2, the fuel filter according to this embodiment is characterized in that the spiral guide projection 92 inclined substantially in the same direction as the oblique passage 74 of the upper end plate 73 is additionally formed on the inner wall face of the outer cylinder 91 forming the filtration chamber 61.

In other words, the fuel filter is characterized in that the spiral guide projection formed substantially in the same direction as the flowing direction of the fuel centrifuged by the centrifugal force applying member flows on the inner wall face of the outer cylinder forming the filtration chamber 61.

The rest of the construction is the same as that of the fuel filter according to the foregoing Embodiment 1 or Embodiment 2, and further explanation thereof is omitted herein.

In the fuel filter according to Embodiment 3 of the construction as described above, the fuel having flown into the filtration chamber 61 is swirled by the oblique passage 74 formed on the outer circumferential face of the upper end plate 73 serving as a fixing member on the lid part side 63 (i.e., swirled by the centrifugal force applying member disposed at the end of the filtering member 66 on the lid part 63 side). Further, the swirling fuel flows obliquely in the same direction with its swirling also kept by the guide projection 92.

As a result, the metal abrasion powder produced due to sliding contact between the commutator and the brush and included in the fuel is more easily separated from the fuel.

In the case described in the foregoing description, the centrifugal force applying member is disposed at the end of the filtering member on the lid part side and the inner wall face of the outer cylinder forming the filtration chamber is provided with the spiral guide projection formed substantially in the same direction as the flowing direction of the fuel centrifuged by the centrifugal force applying member. It is also preferable that the centrifugal force applying member is disposed at the end of the filtering member on the lid part side, the filtering member is provided with the pleats-like folds formed substantially in the same direction as the flowing direction of the fuel centrifuged by the centrifugal force applying member, and the inner wall face of the outer cylinder forming the filtration chamber is provided with the spiral guide projection formed substantially in the same direction as the flowing direction of the fuel centrifuged by the centrifugal force applying member.

In the fuel filter constructed as described above, the fuel having flown into the filtration chamber is centrifuged and swirled by the centrifugal force applying member, and the swirling fuel flows obliquely in the same direction with its swirling kept by both of the pleats-like folds formed on the filtering member and the spiral guide projection formed on the inner wall face of the outer cylinder.

As a result, the metal abrasion powder produced due to sliding contact between the commutator and the brush and included in the fuel is more easily separated from the fuel, and it is possible to further reduce clogging of the filtering member and further extend life of the fuel filter.

Although the fuel filter, which is disposed in the fuel tank 3 and filtrates the fuel discharged from the fuel pump 8, is described in the foregoing Embodiments 1 to 3, it is a matter of course that the same advantages are obtained in case of a fuel filter of a type that is disposed outside the fuel tank 3.

INDUSTRIAL APPLICABILITY

In the fuel filter according to this invention, it is possible to greatly reduce clogging of the filtering member caused by abrasion powder produced in the fuel pump and achieve extension of life as well as miniaturization of the fuel filter, and it is therefore possible to provide a fuel filter suitable for internal combustion engine such as vehicle engine or a fuel supply system in which the fuel filter is used.

What is claimed is:

1. A fuel filter comprising: a filtration chamber including an inner cylinder and an outer cylinder disposed concentrically with a predetermined space, a bottom part that closes an opening end on one end side of said inner cylinder and the outer cylinder, and a lid part, in which a fuel suction pipe and a fuel sending pipe are disposed, that closes an opening end on the other end side of the inner cylinder and the outer cylinder;
   a filtering member that is accommodated in the said filtration chamber and filtrates fuel that flows from said fuel suction pipe into said filtration chamber;
   a centrifugal force applying member which is disposed at an end of said filtering member on said lid part, end of said filtration chamber for centrifuging the fuel that flows into said filtration chamber; and
   a groove portion extending along an inner wall face of the outer cylinder and formed on the bottom part.

2. The fuel filter according to claim 1, characterized in that said filtering member has pleats-like folds formed substantially in the same direction as the flowing direction of the fuel centrifuged by said centrifugal force applying member.

3. The fuel filter according to claim 1, characterized in that a spiral guide projection is formed on the inner wall face of said outer cylinder substantially in the same direction as the flowing direction of the fuel centrifuged by said centrifugal force applying member.

4. The Fuel filter according to claim 2, characterized in that a spiral guide projection is formed on the inner wall face of said outer cylinder substantially in the same direction as the flowing direction of the fuel centrifuged by said centrifugal force applying member.

5. A fuel supply system, comprising:
   a fuel tank in which unfiltered fuel is stored;
   the fuel filter as defined in claim 1; and
   a fuel pump that is disposed in a space portion formed by the inner cylinder of said fuel filter, sends fuel in the fuel tank into said fuel filter, and sends out the fuel filtrated by said fuel filter toward an internal combustion engine.

6. The fuel supply system according to claim 5, wherein the filtering member of the fuel filter has pleats-like folds formed substantially in the same direction as the flowing direction of the fuel centrifuged by said centrifugal force applying member.

7. The fuel supply system according to claim 5, wherein a spiral guide projection is formed on the inner wall face of the outer cylinder of the fuel filter substantially in the same direction as the flowing direction of the fuel centrifuged by the centrifugal force applying member.

8. The fuel supply system according to claim 6, wherein a spiral guide projection is formed on the inner wall face of said outer cylinder substantially in the same direction as the flowing direction of the fuel centrifuged by the centrifugal force applying member.

* * * * *